May 21, 1968     H. C. TEAGLE     3,384,247
UNIVERSAL MOUNT APPARATUS
Filed Oct. 22, 1965     2 Sheets-Sheet 1
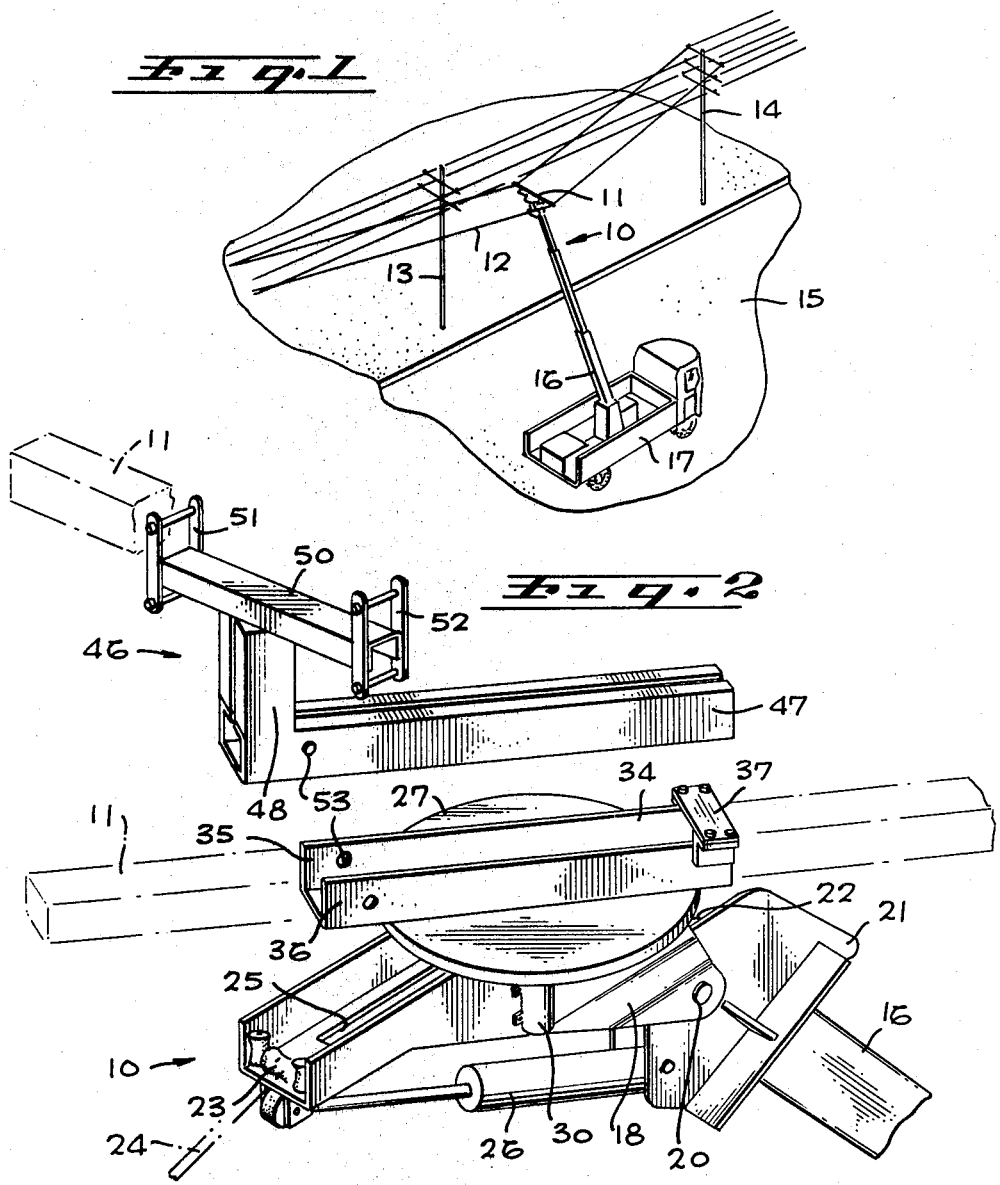
HAROLD C. TEAGLE
INVENTOR.
BY *Allan M. Shapiro*
ATTORNEY May 21, 1968
H. C. TEAGLE
3,384,247
UNIVERSAL MOUNT APPARATUS
Filed Oct. 22, 1965
2 Sheets-Sheet 2
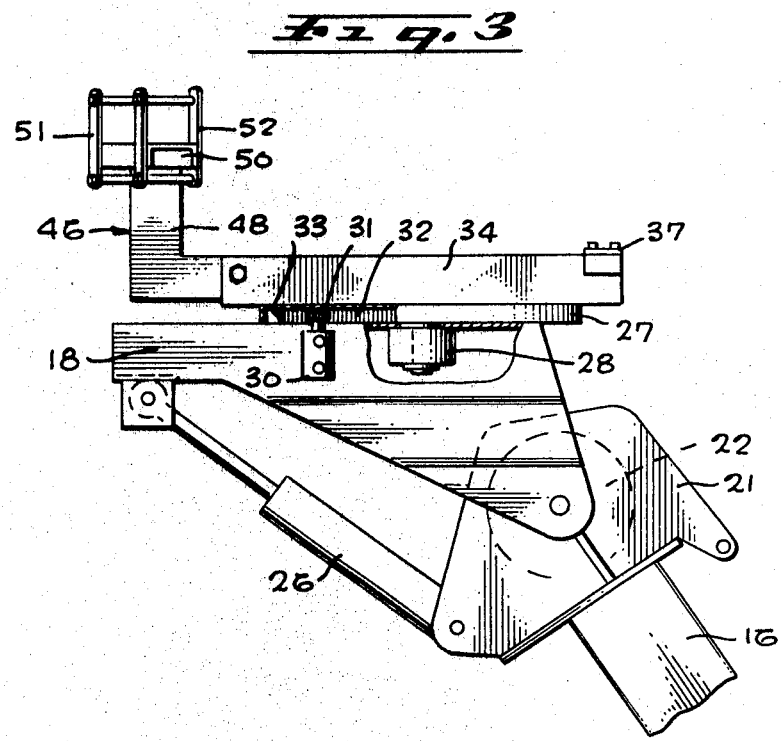
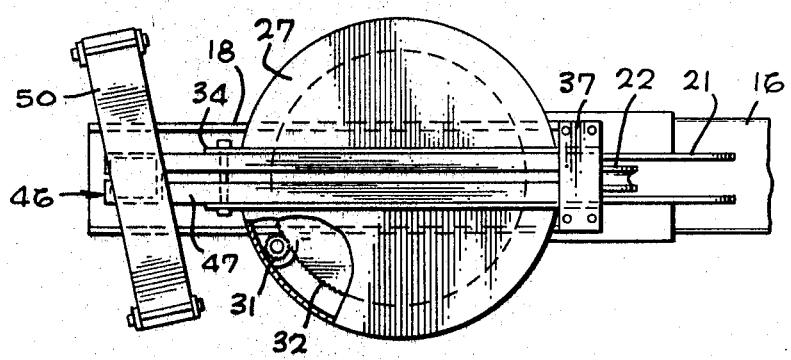
HAROLD C. TEAGLE
INVENTOR.
BY Allan M. Shapiro
ATTORNEY

United States Patent Office 3,384,247
Patented May 21, 1968

3,384,247
UNIVERSAL MOUNT APPARATUS
Harold C. Teagle, 13471 Olive St.,
Orange County, Calif. 92667
Filed Oct. 22, 1965, Ser. No. 501,876
13 Claims. (Cl. 214—1)

ABSTRACT OF THE DISCLOSURE

The mount apparatus disclosed herein is carried by an extendable boom and is adapted to effect the transportation and relocation of utility power lines which are normally carried on a utility pole cross-arm. The mount apparatus includes a member pivotally secured on one end to the boom and a turntable rotably mounted on the pivoting member. A carrier is secured to the turntable and is U-shaped in section having spaced parallel sidewalls to form a substantially rectangular cavity of constant cross-section whereby the carrier is adapted to receive the cross-arm from the utility pole within the cavity so as to support the cross-arm and the power lines carried thereon during transportation. Power means is provided which is operably connected to the member and the turntable for effecting rotation and tilting of the carrier with respect to the boom during transportation of the utility power lines.

This invention relates to a novel universal mount apparatus carried by a boom and more particularly to such an apparatus having 360° rotation and tilt for accommodating the positioning and handling of power lines, utility cables, power pole mounted cross arms, and other public or private utility equipment.

It has been the conventional practice employed by various utility companies to install and mount power lines, telephone cabling, electrical wires and the like on insulated cross arms or beams supported by a series of poles arranged along the side of a street or roadway. Generally, many poles are used which are disposed in fixed space relationship with respect to each other in an in-line relationship whereby a plurality of power lines, utility cables or the like may be carried for many miles above the surface of the terrain so that the lines or cabling will not interfere with surface vehicular traffic, terrain irregularities, building structures or the like. Furthermore, by mounting the lines on the pole cross-arms, a great number of individual lines can be accommodated and ready access is available to each line for service and repair purposes.

However, difficulties have been encountered when moving or relocation of the lines is necessary in instances where the street or roadway is being widened or where storm damage requires mass movement or relocation of the lines. Normally, in such instances, it is required that all power service be disconnected as a safety precaution so that the lines can be handled and so that each line or wire of the plurality may be handled separately by a skilled team of linemen. Oftentimes the lines must be cut prior to relocation and rejoined after the lines have been moved to the new location.

Obviously, a great deal of time and effort is expended in relocating or moving utility lines or power lines from one location to another location. Therefore, the need has long existed for equipment which will permit ready handling of a plurality of utility lines in mass without disconnection of power service which at the same time does not represent a hazard to the skilled linemen performing the relocation order.

Accordingly, the apparatus of the present invention provides a novel means by which an extendable boom may be employed having a 360° rotating and tilting head mount adapted to carry either a plurality of utility lines from one location to the other or which will readily accommodate the moving of a plurality of lines while still attached to the cross arm or beam. In this fashion, time and effort is saved since the individual lines do not have to be disconnected from one cross-arm and reattached or connected to new cross-arms supported by poles at the new location. The mount apparatus or line carrying head includes a carrier fixed to a motor operated turntable rotatably supported on a bracket member which is pivotally mounted on the end of an extendable boom so that the carrier may be selectively oriented by rotation and/or tilting thereof.

A feature of the present invention also resides in the fact that a novel electrically insulated beam or temporary cross-arm may be employed for effecting the lifting or carrying of a plurality of wires which may be regarded as "hot" such as when power is being carried by the lines. The temporary or intermediate cross-arm is readily detachably connected to the rotatable and tiltable head carried by the boom so that the wires being carried thereon may be readily oriented during the relocation thereof. An adapter is provided which may be detachably carried by the turntable including means for clamping onto the beam of cross-arm on which the wires have been originally attached so that the wires and cross-arm may be moved as a unit from one location to another.

Therefore, it is a primary object of the present invention to provide a novel mounting apparatus for releasably carrying a utility pole cross-arm including a plurality of power lines or cables or the like connected thereto from one location to another in mass as a unit.

Another object of the present invention is to provide a novel mounting apparatus capable of achieving simultaneous 360° rotation as well as tilting over a wide angle which may releasably carry either a plurality of power lines or the like on a temporary cross-arm or which may readily accommodate the transportation and relocation of a cross-arm having a plurality of wires or the like attached thereto.

Another object of the present invention is to provide a novel rotatable and tiltable head for handling power pole cross-arms wherein "hot" wires are attached to the cross-arm so that relocation of the cross-arm from its originally installed position need not require the discontinuance of power through the lines or separation of the lines from the cross-arm.

Another object of the present invention is to provide a novel rotating and tilting head for handling power pole cross-arms and/or "hot" wires so that a plurality of such wires may be relocated from their originally installed location to an alternate location without disconnecting the individual wires from the cross-arm or without terminating the supply of power to the power line.

Still another object of the present invention is to provide a novel utility line orientation apparatus which may be carried on one end of an extendable boom for moving and relocating power lines or telephone cabling or the like while such lines or cabling are secured in position as originally installed on power pole cross-arms which greatly increases the efficiency of such relocation and represents a substantial savings in time, effort and complexity.

Still another object of the present invention is to provide a novel power line handling apparatus which includes a simulated power pole cross-arm which is provided with spacer elements for grabbing and retaining "live" power lines and holding them while the simulated cross-arm is moved to a new location.

Yet another object of the present invention is to provide a novel power line transporting apparatus which is adapted to move or relocate "live" lines when repairing the power pole cross arm and/or insulators for moving the poles without disrupting service particularly in such instances as when street widening requires the setting back of a whole line of utility poles.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of the novel mount apparatus of the present invention incorporated on the end of an extendable boom illustrated as being employed in a typical operation for effecting the transportation and relocation of utility power lines;

FIGURE 2 is an enlarged exploded perspective view of the mount apparatus as employed in the embodiment shown in FIGURE 1;

FIGURE 3 is a side elevational view, partially broken away, of the mount apparatus of FIGURE 2 showing the cross-arm adapter carried thereon;

FIGURE 4 is a plan view of the mount apparatus as shown in FIGURE 3; and

FIGURE 5 is a perspective view of an insulator employed in connection with the apparatus of FIGURE 2 wherein a simulated non-conducting cross-arm is employed.

Referring now to FIGURE 1, a typical application or usage is shown of the mount apparatus of the present invention which is indicated in the general direction of arrow 10 for movably supporting a cross-arm 11 having a plurality of power lines, such as line 12 attached thereto. The cross-arm 11 represents one of the cross-arms which are normally carried and supported on a utility pole 13 which pole, in cooperation with other poles such as pole 14, serves to support the plurality of utility lines above the surface of the ground along the side of a roadway indicated by numeral 15.

The mount apparatus 10 is shown as being carried on the end of an extendable telescoping type boom 16 which is pivotally carried and hydraulically operated from a suitable vehicle 17.

The mount apparatus 10 comprises, in general, a yoke-like bracket 18 pivotally mounted at pivot 20 on the end of the boom 16 via a mount member 21. Pivot 20 also serves as an axle for a rope sheave 22 rotatably carried between the side plates of the member 21. On the end of the bracket 18 opposite to its end rotatably carried by the boom 16, there is provided a set of rope rollers 23 for guiding a rope 24 through and out of the bracket 18 and away from the associated mechanism. The rope 24 is trained over the pulley 22 and passes through an elongated slot or passage 25 formed in the bracket 18 and then over the set of rollers 23. The rope 24 has been found useful as an aid for workmen for purposes of guiding, lifting, supporting or other functions which may arise during the course of pole line relocation.

A hydraulic ram 26 is pivotally mounted at its opposite ends to the boom member 21 and the forward end of the bracket 18 adjacent to the set of rollers 23 so that the bracket 18 may be pivotally tilted about the axle 20. A turntable 27 is rotatably mounted on the bracket 18 by means of a bearing mount 28 shown more clearly in FIGURE 3 and is power driven by a motor 30 via pinion gear 31 intermeshing with ring gear 32 provided on the inner surface of a flange 33 of the turntable 27.

An arm tray 34 in the form of a substantially U shaped open ended channel is suitably secured to the top surface of the turntable 27 by any suitable means such as welding, for example. The arm tray 34 is adapted to receive a conventional cross-arm 11 within the cavity between the opposite side plates 35 and 36 defining the channel of the tray 34. The cross-arm 11 may be retained within the tray by means of a suitable retainer plate 37 which may be fastened on its opposite ends to the side plates 35 and 36, by suitable fastener means so that the cross-arm 11 is maintained in position on the arm tray during maneuvering and orientation of the mounting apparatus. Therefore, when the cross-arm 11 is retained within the arm tray 34, the cross-arm can be oriented and maneuvered by means of the turntable 27 for 360° rotation and by pivoting of the bracket 18 by the piston and cylinder assembly 26. A feature of the present invention also resides in the provision of an intermediate power line carrier which may be represented by a nonconductive simulated cross-arm 38 as shown in FIGURE 5. Preferably, the cross-arm 38 is composed of a suitable plastic material such as nylon, for example, and is not employed for permanent installation of power lines onto a supporting power pole but is intended to be employed as a carrier for "hot" wires only during the relocation period from one permanent installation to another. Employing a cross-arm of such non-conductive material permits relocation of "live" high current wires without necessitating the interruption of power service.

To further insure that the plurality of lines 12 are suitably insulated from one another, a plurality of spacer elements, such as indicated by numeral 40 in FIGURE 5, may be employed which are carried on the temporary cross-arm 38 by such means as brackets 41 and 42 which are disposed on opposite sides of the cross-arm and connected together in securing relationship by means of fasteners 43. Each member 40 includes a flared guide element 44 between which is disposed a member 45 upon which a particular wire carrying power may be suitably carried.

In some instances, particularly where obstacles such as a tree, high fences and buildings of the like are encountered, it has sometimes been found desirable to employ an adapter such as is represented in the direction of arrow 46 in FIGURE 2 so that an assemblage of power wires as originally installed on a cross-arm 11 may be maneuvered about the obstacles without the necessity of removing the wires from the cross-arm, cutting the wires or discontinuing the supply of power through the wires. Furthermore, adapter 46 permits the mount apparatus to be positioned in close proximity to the power pole being worked upon so that skilled linemen can easily reach and effect the transference of the cross-arm or the lines to the mount apparatus. The adapter comprises, in general, an elongated member 47 having a configuration adapted to be received within the tray 34 cavity between its opposite sides 35 and 36 whereby the member 47 may be maintained in position on the tray 34 by retainer means 37. One end of the elongated member 47 includes an upright portion 48 which is disposed perpendicular thereto and includes an upper end on which is suitably mounted a cross-arm mount 50. It is to be particularly noted that the cross-arm mount 50 is disposed angularly to the elongated member 47 and that the mount 50 may be readily secured to portion 48 by such means as welding so that the angular position of the mount 50 with respect to the member 47 is maintained and that the mount does not interfere with the boom. Mount 50 includes a suitable cross-arm retaining means as indicated by numerals 51 and 52 so that the cross-arm 11 may be maintained in position on the mount 50 during the orientation and maneuvering of the mount apparatus 10. To further secure the adapter 46 to the tray 34, aligned holes or apertures 53 are provided in both the tray 34 and the member 47. The alignment of the holes 53 with respect to each other permits the insertion of a bolt, pin or the like which fastening means can also pass through the temporary beam 38 or through the permanent beam 11 as the case may be. Conventional cross-arms generally include holes formed therethrough to accommodate the mounting of the cross-arm onto the pole 13 and these holes can be used when aligned with holes 53 to additionally secure the beam and tray 34 is desired.

Therefore, it can be seen that the novel mount apparatus 10 when pivotally attached to an extendable boom greatly facilitates the relocation of power lines. The truck 17 may be positioned in the center between the old line of poles and the new line of poles so that the boom may be swung from the old pole to its new counterpart to which the power lines are to be removed. The turntable and hence the tray 34 can be operated by the motor 30 and the actuator 26 to orient the mount apparatus so as to be in a preferred position to receive either a cross-arm or the plurality of lines.

Once the cross-arm or the lines have been placed in position on the mount apparatus, the boom may be swung over the truck to the new location where the cross-arm or lines may be removed from the mount apparatus and re-assembled with the new power poles. During the swinging of the boom over the truck, the mount apparatus may be re-oriented by rotating or tilting so that the power lines being carried will be retained in their proper relative positions to avoid twisting or tangling of the lines as well as the imposition of excessive stresses. During the course of line transfer, power therethrough need not be discontinued and no lines are required to be severed.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Mount apparatus carried by an extendable boom for effecting the transportation of utility power lines carried on a utility pole cross-arm comprising:
    a member pivotally secured on one end to the boom;
    a turntable rotatably mounted on said member;
    a carrier secured to said turntable and being a substantially U-shaped section having spaced parallel side walls to form a substantially rectangular cavity of constant cross section;
    a cross-arm of electrically non-conductive material releasably secured in said carrier cavity for supporting the lines thereon; and
    power means operably connected to said member and said turntable for effecting rotation and tilting of said carrier with respect to the boom.

2. The invention as defined in claim 1 including a plurality of spacer elements secured to said cross-arm in fixed spaced relationship to maintain the utility lines separated and spaced apart.

3. The invention as defined in claim 2 including
    a rope sheave rotatably carried on the pivot pivotally connecting said bracket to the boom;
    roller means carried on the opposite end of said bracket to its end pivotally secured to the boom; and
    a rope trained over said sheave and said roller means adapted to be useful as an aid for workmen for purposes of guiding, lifting, supporting or other functions during the course of utility line relocation.

4. Mount apparatus movably carried by an extendable boom for effecting the orientation and transportation of utility power lines as installed on a utility pole cross-arm comprising:
    a bracket member having a yoke section formed on one end pivotally secured to the boom;
    a turntable rotatably mounted on said bracket member so as to be pivoted therewith;
    an elongated tray carrier secured to said turntable so as to rotate therewith and being a substantially U-shaped section having spaced parallel side walls to form a substantially rectangular cavity of constant cross section;
    said carrier being adapted to receive the cross-arm within said cavity so as to support the cross-arm and the lines thereon;
    power means operatively coupling said bracket member with said turntable to effect rotation thereof; and
    separate power means operably secured between the boom and the opposite end of said bracket member from its end pivotally connected to the boom to effect a tilting movement of said tray carrier including the supported cross-arm.

5. The invention as defined in claim 4 wherein said rotary power means and said tiltable power means are selectively operable to provide simultaneous rotary and tilting movement of said tray carrier and separate rotary or tilting movement of said tray carrier.

6. Mount apparatus carried by an extendable boom comprising:
    a bracket having a yoke formed on one end thereof pivotally secured to the boom;
    a turntable rotatably mounted on said bracket adapted to rotate in a plane normal to the pivotal movement of said bracket;
    a carrier formed in the configuration of an elongated channel secured to said turntable and having its opposite ends extending beyond the periphery of said turntable;
    a workpiece support detachably carried on said carrier and having an upright mount arranged angularly to the central longitudinal axis of said carrier; and
    power means operably connected to said turntable and said bracket for effecting selective rotation and tilting of said mount whereby a workpiece held by said mount may be maneuvered through various degrees of rotation and tilt.

7. The invention as defined in claim 6 wherein said rotary power means and said tiltable power means are selectively operably to provide simultaneous rotary and tilting movement of said carrier and separate rotary or tilting movement of said carrier during the course of utility line transference from one location to another.

8. Mount apparatus carried by an extendable boom for effecting the relocation and transportation of utility lines mounted on a first set of utility poles to a second set of utility poles comprising:
    a bracket having a yoke formed on one end thereof pivotally secured to the boom;
    a turntable rotatably mounted on said bracket adapted to rotate in a plane normal to the pivotal movement of said bracket;
    a carrier formed in the configuration of a U-shaped channel secured to said turntable having parallel extending side plates defining a longitudinal cavity therebetween and having its opposite ends extending beyond the periphery of said turntable;
    a cross-arm of electrically non-conductive material releasably secured in said carrier cavity for supporting the utility lines during the relocation and transportation thereof; and
    power means operably connected to said turntable and said bracket for effecting selective rotation and tilting of said mount whereby the cross-arm held by said carrier may be maneuvered through various degrees of rotation and tilt without disconnection of power through the lines.

9. The invention as defined in claim 8 wherein said cross-arm is composed of a plastic composition and wherein a plurality of spacer elements are secured to said arm in selectively spaced relationship to maintain the utility lines separated and spaced apart.

10. The invention as defined in claim 9 including
    fastener means for securing said cross-arm to said carrier; and
    means for detachably securing the utility lines to said spacer elements.

11. The invention as defined in claim 10 including
    a rope sheave rotatably carried on the pivot pivotally connecting said bracket to the boom;
    roller means carried on the opposite end of said bracket to its end pivotally secured to the boom; and
    a rope trained over said sheave and said roller means adapted to aid the workmen for purposes of guiding, lifting, supporting or other functions during utility line relocation.

12. Mount apparatus carried by an extendable and swingable boom for effecting the relocation and transportation of utility lines mounted on a first set of utility poles to a second set of utility poles comprising:
- a bracket having a yoke formed on one end thereof pivotally secured to the boom for vertical tilting movement of said bracket;
- a turntable rotatably mounted on said bracket and being adapted to rotate in a plane normal to the plane of vertical pivotal movement of said bracket;
- a carrier in the form of a substantially U-shaped section having spaced parallel side walls forming a substantially rectangular channel therebetween and having its opposite ends extending beyond the periphery of said turntable;
- a workpiece support having an elongated body portion detachably secured within said carrier channel and having an upright portion projecting from the end of said support opposite to its end nearest the boom at a right angle to said support;
- a mount fixed to the free end of said support and arranged at an angle to the central longitudinal axis of said carrier;
- fastener means carried on each end of said mount for detachably receiving an electrically non-conductive member adapted to temporarily support the utility lines during the relocation procedure of the utility lines; and
- power means operably connected to said turntable and said bracket for effecting selective rotation and tilting of said mount whereby said electrically non-conductive member held by said mount may be maneuvered through various degrees of rotation and tilt without disrupting the supply of power through the utility lines.

13. Mount apparatus adapted to be carried on a rotatable and tiltable member mounted on the free end of an extendable boom for effecting the relocation and transportation of utility lines carried on a first set of utility poles to a second set of utility poles comprising:
- a substantially L-shaped member detachably coupled to the boom mounted member and having an upright portion integrally disposed on one end thereof projecting upwardly at a right angle from a base portion thereof;
- a mount fixed to the free end of said upright portion and being arranged so that its longitudinal axis is angularly disposed to the central longitudinal axis of said body portion in a selected position with respect to the boom so as not to interfere therewith; and
- fastener means carried on each end of said mount for detachably receiving an electrically non-conductive member adapted to temporarily support the utility lines during the relocation thereof whereby the utility lines may be maneuvered about obstacles located in close proximity to the utility poles in such a fashion as to avoid interference or encounter with either the boom or the obstacles.

References Cited

UNITED STATES PATENTS

| | | | |
|---|---|---|---|
| 2,396,161 | 3/1946 | Cullen. | |
| 2,613,822 | 10/1952 | Stanley | 214—1 |
| 3,247,986 | 4/1966 | Eyler et al. | 214—133 |

HUGO O. SCHULZ, *Primary Examiner.*